Figure 1:
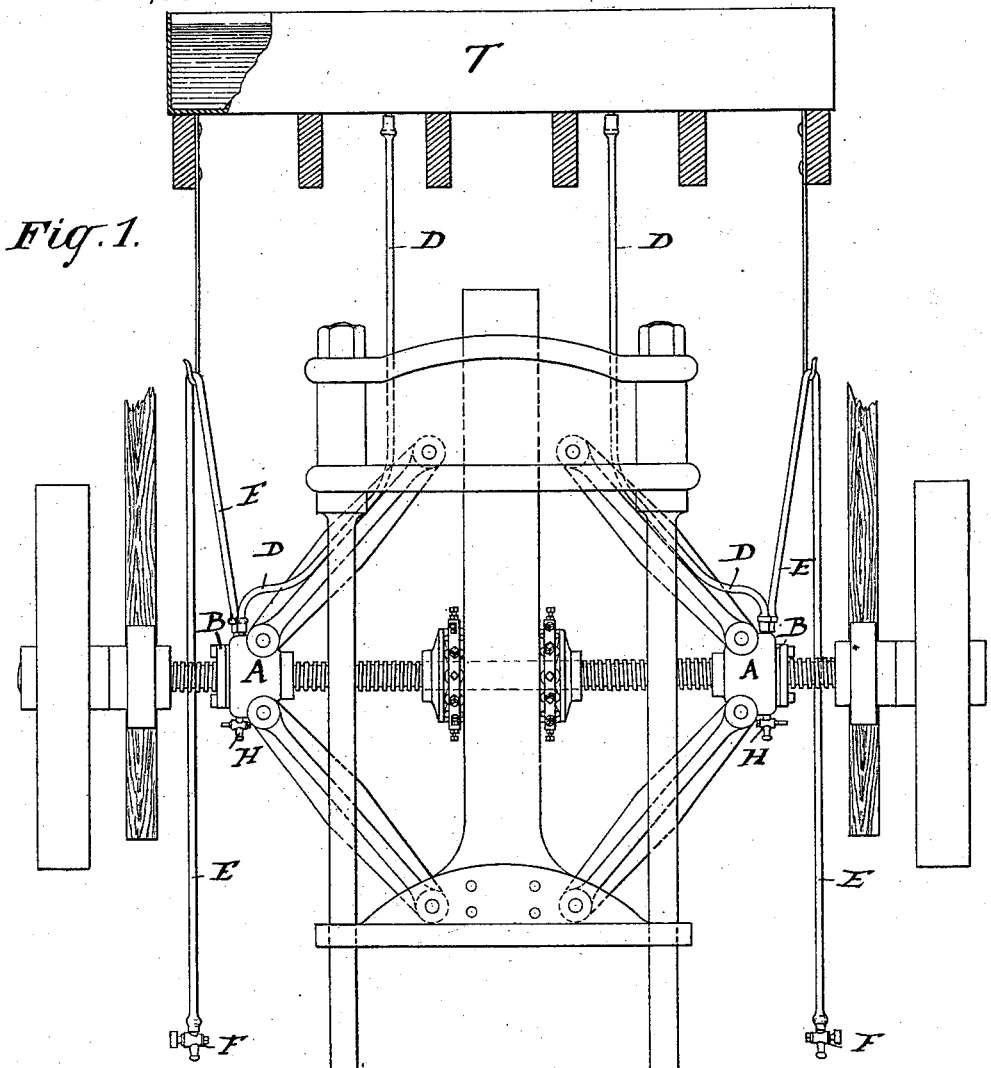

(No Model.) 2 Sheets—Sheet 1.

G. B. BOOMER.
SCREW BEARING FOR PRESSES.

No. 378,950. Patented Mar. 6, 1888.

WITNESSES
John Becker
J. C. Clayton

INVENTOR
George B. Boomer
by
Attorneys (No Model.) 2 Sheets—Sheet 2.
G. B. BOOMER.
SCREW BEARING FOR PRESSES.
No. 378,950. Patented Mar. 6, 1888.
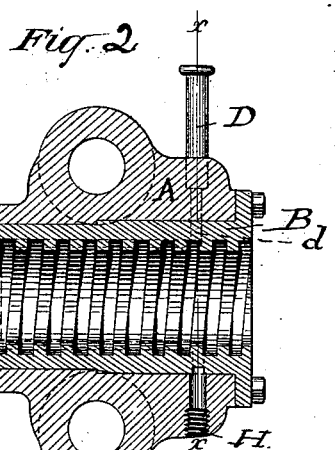
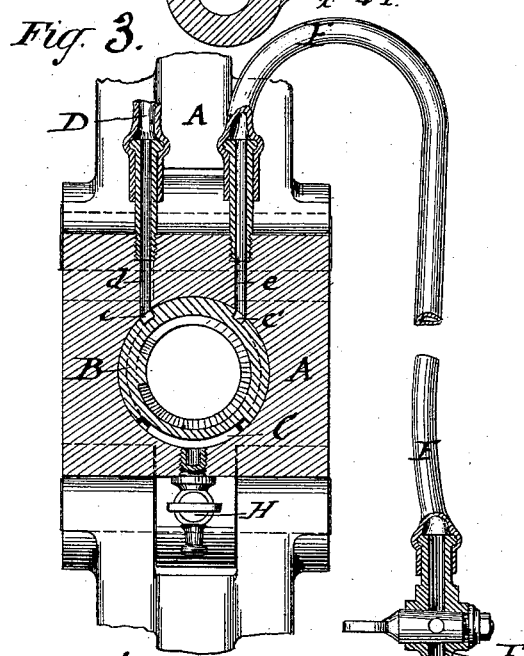
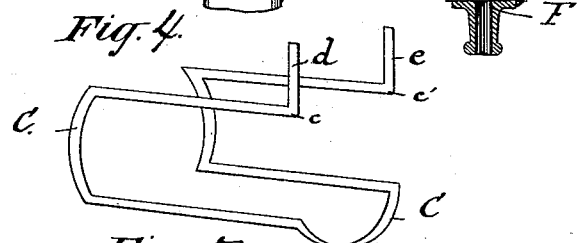
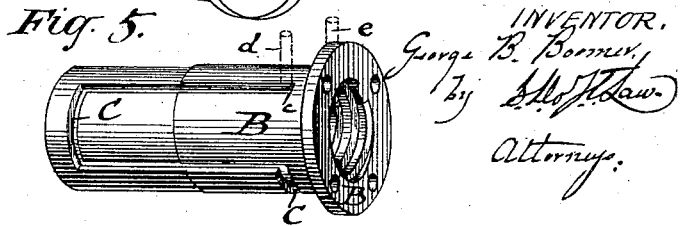
WITNESSES.
John Becker.
J. C. Clayton.
INVENTOR.
George B. Boomer,
by
Attorneys.

UNITED STATES PATENT OFFICE.

GEORGE B. BOOMER, OF MOUNT PLEASANT, NEW YORK.

SCREW-BEARING FOR PRESSES.

SPECIFICATION forming part of Letters Patent No. 378,950, dated March 6, 1888.

Application filed June 18, 1887. Serial No. 241,716. (No model.)

*To all whom it may concern:*

Be it known that I, GEORGE B. BOOMER, a citizen of the United States, and a resident of the town of Mount Pleasant, in the county of Westchester and State of New York, have invented certain new and useful Improvements in Screw-Bearings for Presses, of which the following is a specification.

My invention is an improvement in the knuckle-joint press invented by George B. Boomer, Thomas G. Morse, and Rufus E. Booschert, for which Letters Patent were granted November 1, 1870, and numbered 108,753, and relates to the screw-nuts to which the outer ends of the toggle-joints are connected and through which the horizontal screw passes; and it consists of an improved device for keeping the nut cool and preventing it from being heated by the friction of the screw working within.

In the accompanying drawings, illustrating my improvement, in which like letters indicate like parts, Figure 1 is an elevation of the press, showing the screw-nuts A with my improvement attached. Fig. 2 is a sectional side view of the screw-nut A, showing the brass lining or sleeve B in position, with the inlet-tube and tube for emptying the channel in the same. Fig. 3 is an end view of the screw-nut, partly in section through the line $x\ x$, Fig. 2, showing the brass lining or sleeve B in place, with the channel C in the same and the inlet and outlet pipes to the latter. Fig. 4 is a view of the channel C as it is formed in the brass lining or sleeve B. Fig. 5 is an outside view of the brass lining or sleeve B, with the channel C formed in the same.

As the press is ordinarily constructed, a brass lining or sleeve, B, provided with screw-threads on its inner surface, is placed within the nut A, so that the horizontal steel screw of the press works or turns in this brass sleeve. By reason of the two different metals—the steel of which the screw is constructed and the brass forming the lining or sleeve B—the friction of the horizontal screw in the nut is greatly lessened and the screw is enabled to turn more easily in the nut. When very rapid work is required, enough friction, however, is still produced between the nut and the screw to heat them considerably, and as the brass sleeve expands more readily with the same amount of heat than the steel screw it sometimes occurs that the threads on the screw fail to engage properly with those in the brass lining, and the efficiency of the press is thereby impaired. My improvement is designed to prevent this heating, and consequently the expansion, of the brass lining of the nut, and keep the nut cool while the press is being worked and insure the screw engaging properly at all times with the threads in the nut.

My improvement consists in forming on the outer surface of the lining of the nut containing the screw-threads narrow grooves which form inclosed channels or ducts between the lining and outer nut when the former is in position within the latter, and connecting these channels with suitable supply and escape pipes, by which a stream of water constantly passes through the channels and serves to keep the nut cool.

The arrangement of the channels, as I prefer to construct them, will be understood from the drawings. As there seen, and as shown in Fig. 5, the channel C commences at the top of the sleeve near one end and extends lengthwise of the same nearly to the opposite end, when it passes a quarter around the sleeve, then back lengthwise of the same, and so on until it has encircled the surface of the sleeve, and ends on the upper side at $c'$ opposite to and near the point where it commenced. The channel or groove C thus extends four times along the surface of the sleeve from end to end, and is continuous from the point $c$, where it begins, to $c'$, where it ends, as shown in Fig. 4. The sleeve B, with this channel C cut in its surface, is placed in the nut A, as is shown in Figs. 2 and 3. The groove C now forms a continuous closed channel or duct, the open side being inclosed by the nut within which the sleeve is placed, terminating in the ends $c$ and $c'$ on the upper side of the sleeve. After the sleeve B is in place in the nut small channels or openings $d$ and $e$ are formed in the nut from the outer surface, communicating with the ends $c$ and $c'$ of the channel C, as shown in Fig. 3, and to the outer ends of these channels or openings are attached hose or pipes D and E, by which water enters and leaves the channel C.

The inlet or supply pipe D may be connected with a tank, T, Fig. 1, placed above the press, from which a supply of water may be obtained, or, if desired, may be connected with the usual water-service.

The outlet-pipe E, which may be connected with any convenient vessel to receive the water or with the waste-pipe of the water-service, is provided near its lower end with the cock F, by which the pipe can be opened or closed.

As will be understood from the drawings, when the cock F is opened a continuous open passage is established through the inlet-pipe, the channel C, and outlet-pipe, and the water in the tank T flows in a continuous stream through the channel C, thus keeping the nut A and lining B cool, and preventing it being heated by the friction of the screw, and the consequent expansion of the sleeve or lining B. A petcock, H, is placed at the lower side of the nut A and communicates with the channel C at its lowest point, by which the water can be drawn off from the channel when it is desired to empty the latter.

My improved device for keeping the nut cool may be used equally well when the lining is constructed of the same metal as the screw itself, and prevents the screw and nut from being heated and destroying the lubricant and injuring the screw and nut.

Although my improvement is shown and described above as applied to a knuckle-joint press, it is equally adapted to any screw-press in which the nut is constructed in a similar manner.

What I claim is—

1. In a knuckle-joint press, the sleeve B, provided with screw-threads on its inner surface, and having grooves or channels on its outer surface adapted and arranged for the passage of water through the same, as and for the purpose set forth.

2. In a knuckle-joint press, the combination, with the nut A, of the sleeve B, provided on its inner surface with screw-threads, and having grooves or channels on its outer surface arranged and adapted for the passage of water through the same, as and for the purpose set forth.

3. In a screw-press, the combination, with the screw, of the nut having a sleeve provided with grooves or channels on its outer surface, arranged and adapted as and for the purpose set forth.

Signed at New York, in the county of New York and State of New York, this 7th day of June, A. D. 1887.

GEO. B. BOOMER.

Witnesses:
FRED N. CUNNINGHAM,
JAMES T. LAW.